Patented May 20, 1930

1,758,937

UNITED STATES PATENT OFFICE

GEORGE H. EARP-THOMAS, OF GLEN RIDGE, NEW JERSEY

LACTOBACTERIA PRODUCT

No Drawing. Application filed December 5, 1925. Serial No. 73,523.

The invention relates to an improved lactobacteria product, and particularly to a fluid oil product containing viable lactobacteria, suitable for implantation in the intestinal tract and for propagation therein. The preferred product consists in an emulsion of an oil having certain desired properties, this emulsion containing viable lactobacteria (preferably a pure composite culture containing B. acidophilus and other lactobacilli), and a desired proportion of a culture medium, or food for the organisms, this latter substance, together with the bacteria, being suspended in, and uniformly distributed through, the emulsion.

The product referred to has various advantages in comparison with the milk product, such as B. acidophilus milk, which comprises the usual form in which such lactobacteria are commonly presented for ingestion. Thus an oil may be used, such as a suitable mineral oil, which will lubricate the intestinal tract, in addition to securing the full advantage of implanting the viable culture therein, or advantageous properties of other oils may be secured, such as the building-up property of cod liver oil, by using such oil as the carrier for the culture. Additionally, a more palatable product is provided than the usual lactobacillus milk, and furthermore, the great advantage is gained that the product can be kept for a considerable time without deterioration, whereas B. acidophilus milk, or the like, on sale, becomes sour or stale in a few days, so that it must be replaced by fresh lactobacillus milk.

It is of course evident that a product of the character mentioned will be of little therapeutic value unless the organisms implanted in the intestinal tract thereby, are in active condition and adapted to propagate in the intestines. I have found that when a proper culture is used, and when a substance is added, having the property of keeping the organisms viable and vigorous in the oil carrier, the product may be kept for a considerable time, as stated, without deterioration. Emulsifying the oil serves to maintain the bacteria, and the food or culture medium therefor, in suspension, uniformly distributed through the product.

Objects of the invention comprise the provision of improved products of the character indicated. The invention consists in the improved products, all as will be more fully set forth in the following specification, and be particularly pointed out in the appended claims.

In preparing the product, an emulsion is preferably formed of a suitable oil and a suitable emulsifying agent therefor. The oil may be any oil suitable for, and having desired properties for, ingestion. As stated, mineral or other oils suitable for lubrication of the intestinal tract, and oils having special therapeutic effects, such as cod liver oil, are particularly referred to. An emulsion of such oil is prepared in the usual way, by the use of any emulsifying agent having properties which are not harmful, or which may be helpful, in a product which is to be ingested. Among such emulsifying agents may be mentioned agar-agar, Irish moss, gum tragacanth, etc., as much of the same being used as is required to emulsify the product, in the well-known manner.

The culture of lactobacteria is prepared separately, in a suitable culture medium therefor, such as milk or whey. A pure culture should be prepared of vigorous organisms, this preferably being a pure composite culture of lactic-acid-producing organisms comprising chiefly B. acidophilus and B. bifidus and/or B. bulgaricus, and preferably such other symbiotic bacteria as glyco-bacteria, which produce carbohydrates which aid in the growth of the other bacteria.

The culture medium or growth promoting material which is to be added, in comparatively small quantity, to the emulsion, may also be separately prepared. This is intended to keep the organisms alive and vigorous in the emulsion, and is desirable because the oil itself, in the case of mineral oils, cod liver oil, etc., does not contain any carbohydrates or other food for the culture, and it is therefore difficult to keep the organisms viable if no such addition is made. As examples of this material may be mentioned lactose, or dextrin, or lacto-dextrin, or other desirable substances having the properties of promoting the growth or serving as natural foods for the organisms. Such material may provide a food, or life-sustaining element, for the organisms, in much more concentrated form than is provided by the original culture medium in which the organisms are grown.

The lactobacteria and the lactose or other material for maintaining the lactobacteria viable, in suitable proportions, may be added to the emulsion after the latter has been prepared, after which the product is shaken or agitated to distribute the added substances uniformly therethrough. The organisms should preferably be in moist state when added to the emulsion, and are added in suitable proportion for the desired dosage, such as a proportion of one-half billion bacilli per cubic centimeter of emulsion. The organisms may, for example, be removed from their original culture medium by settling. The added concentrated culture-medium, or food element for the organisms, should be in sufficient proportion to maintain the bacteria viable, so that they will flourish and increase in numbers when implanted in the intestinal tract, upon ingestion. This proportion will vary in accordance with the particular culture of lactic-acid producing organisms used, but may be, for example, between 1 and 5 per cent of the total product, by volume, after its addition to the emulsion. The proper proportions may readily be determined by an experienced operator by test, to determine what proportion of added food-material is sufficient to maintain the culture viable.

The emulsifying agent in the emulsified product serves to prevent the culture from settling out of the carrier therefor, the organisms being preserved in moist condition by the surrounding oil, and maintained in sufficiently close relation to the food element therefor to be maintained in viable state.

The product has the advantage, in addition to points previously noted, that it is easily taken, and is more palatable than the lactobacillus milk, and also more than plain mineral oils. The taste of B. acidophilus milk, or the like, is objectionable to many people, because of the acidity generated by the cultures in the milk, whereas in the emulsified product described there is no more than slight production of lactic acid.

It should be understood that the invention is not limited to the details described, other than is indicated by the accompanying claims.

I claim:

1. A new product comprising an oil emulsion containing viable lactobacteria and a culture medium therefor, suspended in the emulsion.

2. A new product comprising an oil emulsion containing viable lactobacteria and lactose, suspended in the emulsion.

3. A new product comprising an oil emulsion containing a pure composite culture of viable lactobacteria, chiefly B. acidophilus and B. bifidus and B. bulgaricus.

4. A new product comprising an emulsion of a mineral oil with an emulsifying agent therefor and containing viable lactobacteria and material for maintaining the same viable, suspended in and uniformly distributed through the emulsion.

5. A new product comprising fluid oil carrying lactobacteria and material for promoting the growth thereof.

6. A new product comprising an oil emulsion containing viable lactobacteria in suitable proportion for ingestion, and material for maintaining the same viable, in the proportion of from one to five per cent of the emulsion.

7. A new product comprising an oil emulsion containing a pure composite culture of viable lactobacteria, chiefly B. acidophilus and B. bifidus and B. bulgaricus, and symbiotic bacteria.

In testimony whereof I have signed my name to this specification.

GEORGE H. EARP-THOMAS.